United States Patent [19]
Lindeborg et al.

[11] 3,749,267
[45] July 31, 1973

[54] APPARATUS FOR TILTING OR OVERTURNING A CONTAINER, E.G., FOR REFUSE

[75] Inventors: David Georg Lindeborg; Åke Bertil Ingemar Dahlin, both of Blomstermala, Sweden

[73] Assignee: Norba Aktiebolag, Blomstermala, Sweden

[22] Filed: Mar. 27, 1972

[21] Appl. No.: 238,344

[30] Foreign Application Priority Data
Apr. 1, 1971 Sweden.............................. 4231/71

[52] U.S. Cl................. 214/501, 214/130 R, 298/14
[51] Int. Cl.............................................. B60p 1/04
[58] Field of Search ................... 298/11, 12, 13, 14, 298/15, 16, 17; 214/501, 517, 710, 777, 130 R; 212/8; 254/135 R, 148

[56] References Cited
UNITED STATES PATENTS
2,457,346  12/1948  Carlson et al........................ 214/777
3,355,043  11/1967  Talbert ............................... 214/501

Primary Examiner—Robert G. Sheridan
Assistant Examiner—Lawrence J. Oresky
Attorney—Cushman, Darby & Cushman

[57] ABSTRACT

A container, e.g., for refuse, rests upon a pivotable support frame or the like on a preferably wheeled chassis and is pivotable upwards from a substantially horizontal position to a substantially vertical position by means of preferably hydraulic jack or ram. The container is hoisted up on to the frame and lowered therefrom, e.g., to the ground, while being rotated 90°, by pivoting the frame. At least one wire or the like, which is secured to a stationary fastening point in a selected position on said chassis and therefrom runs over a first pulley or the like and from said pulley extends to a fastening on the container is provided for holding the container and for preventing it from being subjected to shocks and the like during the tilting operation.

6 Claims, 3 Drawing Figures

PATENTED JUL 31 1973 3,749,267

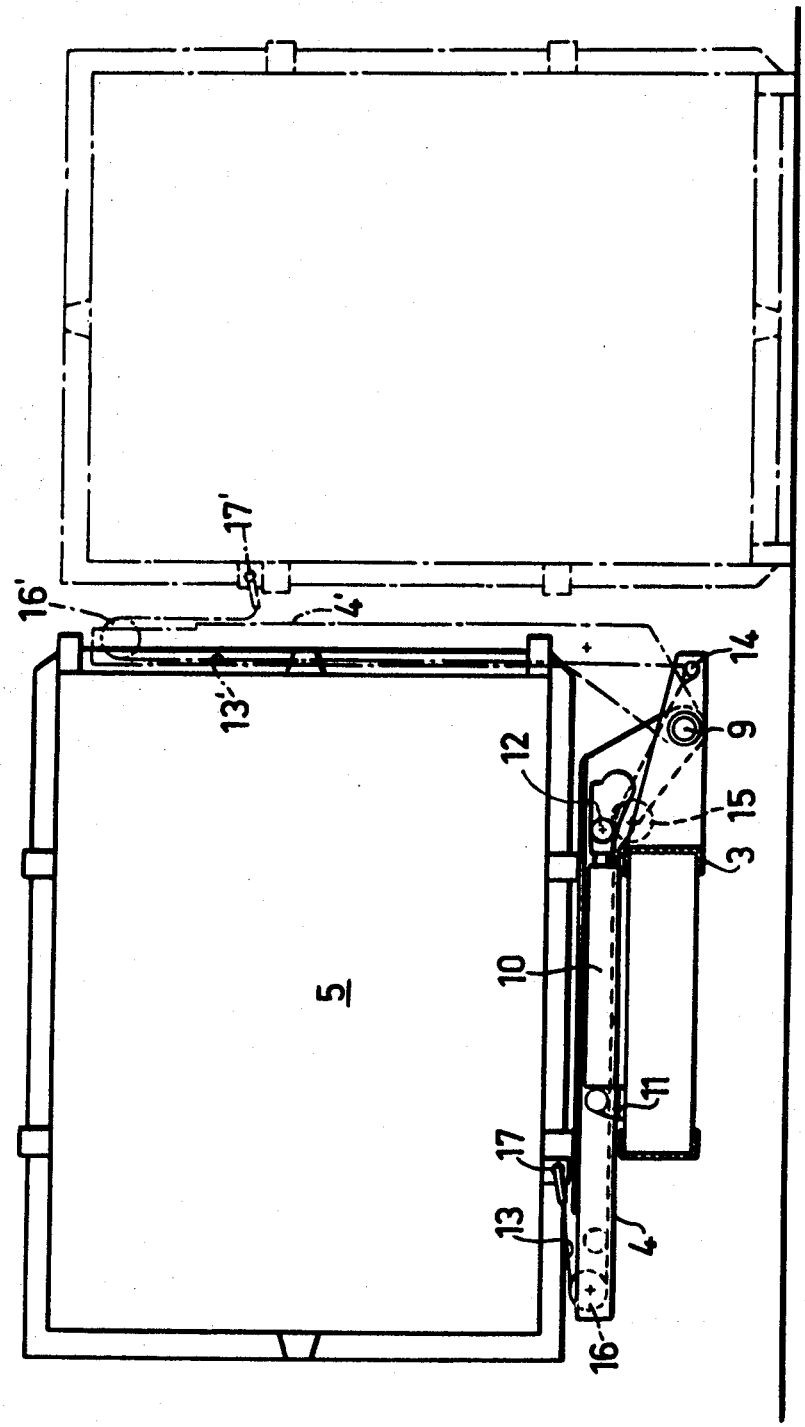

3,749,267

APPARATUS FOR TILTING OR OVERTURNING A CONTAINER, E.G., FOR REFUSE

This invention relates to an apparatus for tilting or overturning a container, e.g., for refuse, which rests upon a support frame or the like on a preferably wheeled chassis, from the support frame to a base, e.g., ground. The support frame is pivotable upwards on an axis located adjacent to one end of the support frame from a substantially horizontal position to a substantially vertical position by means of a preferably hydraulic jack or ram.

In a preferred embodiment of the invention said container constitutes a collecting container for refuse, and the chassis is a semi-trailer, which is coupled to a small tractor or the like and suitably also carries a compactor. A vehicle of this kind is primarily intended for use within habitation aereas and the like, e.g., refuse locations, where it is not possible to get along with ordinary refuse trucks, which are too heavy and bulky. The refuse, which may be comprised of garbage sacks, is introduced into the compactor, which feeds it into the collecting container and compacts it. After a completed tour through the aerea in question, the container tilted down or overturned by means of an apparatus according to the invention on a location, where it may be collected by a truck for further transport to a refuse disposal plant.

According to the invention the apparatus for tilting or overturning the container is primarily characterized in that at least one wire or the like is secured to a stationary fastening point on said chassis and therefrom runs over a first pulley or the like provided on the opposite side of said support frame with respect to said pivot axis, and from said pulley extends to a fastening provided on the container and to which said wire is releasably secured, said fastening suitably being located closer to the fastening point of the wire than is the pulley, and in that the fastening point of the wire on the chassis is positioned in such a way that the distance between said fastening point and said pulley, as measured along the wire, is larger in the substantially horizontal position of the support frame than it is in the substantially vertical position of the support frame.

Further features and advantages of the apparatus according to the invention will become apparent from the following detailed description and the annexed drawing, which diagrammatically and as non-limiting example illustrates a preferred embodiment of the invention and in which:

FIG. 3 is an end view on a larger scale of a portion of the chassis and the tilting apparatus and illustrates in solid lines the container resting upon the chassis and in dash-dot lines the container tilted down to the ground.

Figure 1:
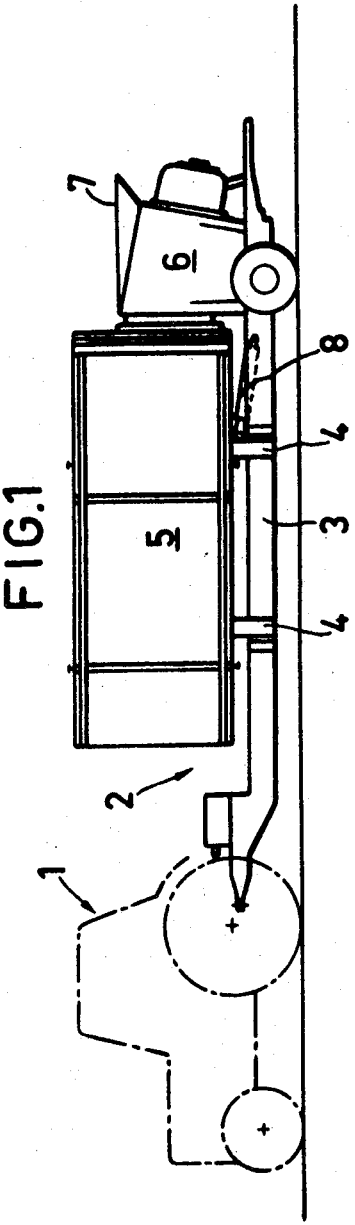
FIG. 1 is a side-view of a vehicle with a semi-trailer, which is provided firstly with a tilting or overturning apparatus according to the invention for a container resting upon the semi-trailer, and secondly with a compactor coupled to the container.
Figure 2:
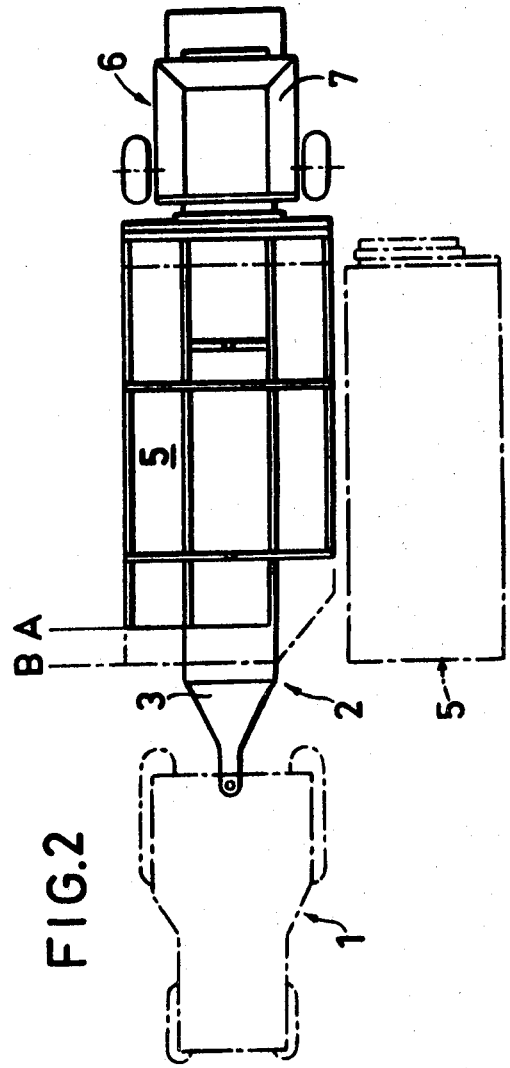
FIG. 2 is a plan view corresponding to FIG. 1 and illustrating the container in its tilted or overturned position.

In FIG. 1 and 2 there is illustrated a traction vehicle 1, e.g., in the form of a small tractor, and a semi-trailer, which is generally designated 2 and is coupled to the traction vehicle. The semi-trailer comprises a chassis 3, which carries a support frame 4 upon which a collecting container 5 rests, and a compactor 6, which is coupled thereto and has a filling-in opening 7. The container 5, which is primarily intended for refuse or garbage, may by means of a jack or ram, which is hydraulic in the illustrated embodiment, be separated from the compactor 6 and displaced from the position A shown in FIG. 1 and in solid lines in FIG. 2 to the position illustrated in dash-dot lines in FIG. 2.

In its lastmentioned position the container 5 may be tilted off from the chassis 3 by means of the tilting or overturning apparatus illustrated in FIG. 3. This apparatus comprises, in addition to the abovementioned support frame 4, which has the form of a bell crank, which is journalled on the axis 9 in the chassis 3, at least one jack or ram 10, which is hydraulic in the illustrated embodiment and is interconnected between a bracket 11 on the chassis and a pivot axis 12, which is located at the end of the shorter arm of the bell crank 4, and at least one wire or the like 13, which is secured to a fastening point 14 on the chassis and therefrom runs over a first pulley 16 and a second pulley 15, which are rotatably journalled in the support frame 4, to a fastening 17, which is provided on the container 5 and in which the wire is detachably hooked on.

In FIG. 3 the different members are illustrated in solid lines in the position, which they occupy, when the container 5 rests upon the chassis, and in dash-dot lines in the position corresponding to tilted or overturned container. In the lastmentioned position the different reference designations have been provided with accent marks. The container is tilted off from the chassis 3 by turning or rotating the carrier frame 4 crockwhise on the axis 9 by means of the ram or jack 10. During the first portion of the rotational movement the angle between those portions of the wire 13, which are located on opposite sides of the pulley 15, is strightened out, which permits the container to slide downwardly to the right in FIG. 3, i.e., constitutes a commencing lowering of the container 5. According as the carrier frame 4 and the container 5 are turned towards the position illustrated in dash-dot lines, that portion of the wire, which is located between the fastening point 14 and the pulley 16 is shortened, due to the fact that the fastening point 14 is positioned on the opposite side of the pivot axis 9 of the support frame 4 with respect to the pulley 16, as seen in the end view according to FIG. 3. The lowering is consequently continued easily and smoothly until the container 5 has been tilted off onto the ground or another base and in so doing reached the position shown in dash-dot lines in FIG. 3.

By means of the tilting or overturning apparatus according to the invention a similar container, which is possibly already available on the right place, may subsequently be tilted up onto the chassis, and hereby the sequence of operations is the opposite to that described above.

Thanks to the invention the additional advantages is gained that the movements of the semi-trailer and the truck become independent of each other.

The embodiment described above and illustrated in the drawings is, of course, to be regarded merely as a non-limiting example and may as to its details be modified in several ways within the scope of the following claims. With respect to the pulleys, it is thus not necessary that the firstmentioned one is journalled on a stationary axis, but the axis of this pulley may, in a modified embodiment, be translationally displacable, e.g., while overcoming the force of a spring. At least in this case the second pulley may be omitted.

What we claim is:

1. Apparatus for tilting or overturning a container, particularly for refuse, which rests upon a support frame, from said support frame to a base, particularly ground, comprising a chassis for carrying said support frame, and jack or ram means for pivoting said support frame upwards, on an axis located adjacent to one end of the support frame, from a substantially horizontal position to a substantially vertical position, characterized by the provision of fastening means on said container, a stationary fastening point on said chassis, a first guide means, such as a pulley, provided on the opposite side of said support frame with respect to said pivot axis, at least one wire means, which is secured to said stationary fastening point and therefrom runs over said guide means and from said guide means extends to said fastening means on said container, to which said wire is releasably secured, said fastening means suitably being located closer to said fastening point of the wire than is said guide means, said fastening point of the wire on the chassis being positioned in such a way, that the distance between said fastening point and said guide means, as measured along the wire, is larger in the substantially horizontal position of said support frame than it is in the substantially vertical position of said support frame.

2. Apparatus according to claim 1, characterized in that said first guide means is a first pulley which is movable, preferably while overcoming a resistance, e.g. from spring means.

3. Apparatus according to claim 1, characterized by the provision of at least one second pulley, which is journalled in said chassis in a point, which is located between said fastening point of the wire and said first guide means in such a way, that said wire runs over said second pulley solely under the first portion of the swinging-up movement of said support frame.

4. Apparatus according to claim 1, characterized in that said support frame is comprised of an one-armed lever, and in that said jack or ram is interposed between a point on the shorter arm of said support frame and a stationary point on said chassis.

5. Apparatus according to claim 4, characterized in that said lever is a bell-crank.

6. Apparatus according to claim 4, characterized in that said first guide means and said fastening point of said wire on said chassis are located in such a way with respect to the pivot axis of said lever, that the projection of said axis on a plane parallel thereto and extending through said first guide means and said fastening point is positioned between said firstguide means and said fastening point.

* * * * *